United States Patent [19]
Jones et al.

[11] 4,052,082
[45] Oct. 4, 1977

[54] ARTICULATED HANDLE WHEELED VEHICLE

[75] Inventors: Lawrence T. Jones, Playa Del Rey; Anson Sims, Northridge, both of Calif.

[73] Assignee: California R & D Center, Culver City, Calif.

[21] Appl. No.: 703,014

[22] Filed: July 6, 1976

[51] Int. Cl.² .............................................. B62B 7/00
[52] U.S. Cl. ........................................... 280/87.02 R
[58] Field of Search ..................... 280/87.01, 87.02 R, 280/87.02 W, 47.37, 1.1 R

[56] References Cited
U.S. PATENT DOCUMENTS

| 1,662,292 | 3/1928 | Bender | 280/87.01 |
| 1,802,400 | 4/1931 | Benson | 280/47.37 R |
| 1,946,422 | 2/1934 | Carter | 280/87.01 |
| 2,728,585 | 12/1955 | Walline | 280/87.01 X |

Primary Examiner—Joseph F. Peters, Jr.
Assistant Examiner—R. Schrecengost
Attorney, Agent, or Firm—Jackson & Jones Law Corporation

[57] ABSTRACT

A toy three wheeled vehicle includes a retroflex articulated handle. The vehicle comprises a body member having a trapezoidal configuration with two rear wheels mounted on an axle and a front swivel wheel. The articulated handle includes two parts that are pivotally mounted together with one of the parts being, in turn, pivotally mounted to the body member within a recessed storage channel. The articulated handle, when in the retroflexion state, can be stored flush with the surface of the body member. The body member further includes a floor board having a pivotable portion which can be folded back upon itself to provide both an opening for an operator's legs and a seat for the operator.

9 Claims, 4 Drawing Figures

ARTICULATED HANDLE WHEELED VEHICLE

BACKGROUND OF THE INVENTION

1. Field of the Invention

The present invention is directed to the toy industry and more particularly to a combination wagon and scooter vehicle having a unique storage handle.

2. Description of the Prior Art

A large number of wheeled vehicles have been utilized as toys for children. In addition, a wagon has been a common child's toy for a large number of years. With the introduction of molded plastic frames various forms of vehicular children toys have taken a large number of shapes.

The known prior art, however has not provided a versatility of both a wagon and a vehicular toy in one embodiment.

SUMMARY OF THE INVENTION

Present invention provides a three wheel toy vehicle having a body member with a plurality of rotatable wheels attached thereto. An articulated handle is connected to the body member and has at least two parts pivotally mounted to each other and capable of retroflexion. A storage recess on the body member can store the handle, in a state of retroflexion, flush with the body member. The floor board of the toy vehicle includes a pivotable member that can provide an opening for an operator's legs when in a scooter mode of operation. With the floor board member closing the opening, the vehicle becomes a wagon.

In one form of the present invention the body member has an approximately trapezoidal shape and a pair of rear wheels are rotatively connected to the rear of the body member and a front wheel is swivelly connected to the front.

The features of the present invention are believed to be novel where set forth, particularly in the appended claims. The present invention, both as to its organization, manner of operation, together with further objects and advantage thereof, may best be understood by reference to the following description taken in conjunction with the accompanying drawings.

DESCRIPTION OF THE PREFERRED EMBODIMENT

The following description is provided to enable any person skilled in the toy industry to make and use the invention and it sets forth the best mode contemplated by the inventors of carrying out their invention. Various modifications, however, will remain readily apparent to those skilled in the above art, since the generic principles of the present invention has been defined herein specifically to provide a relatively economical and easily manufactured articulated handled wheeled vehicle to provide a versatile toy for children.

Figure 1:
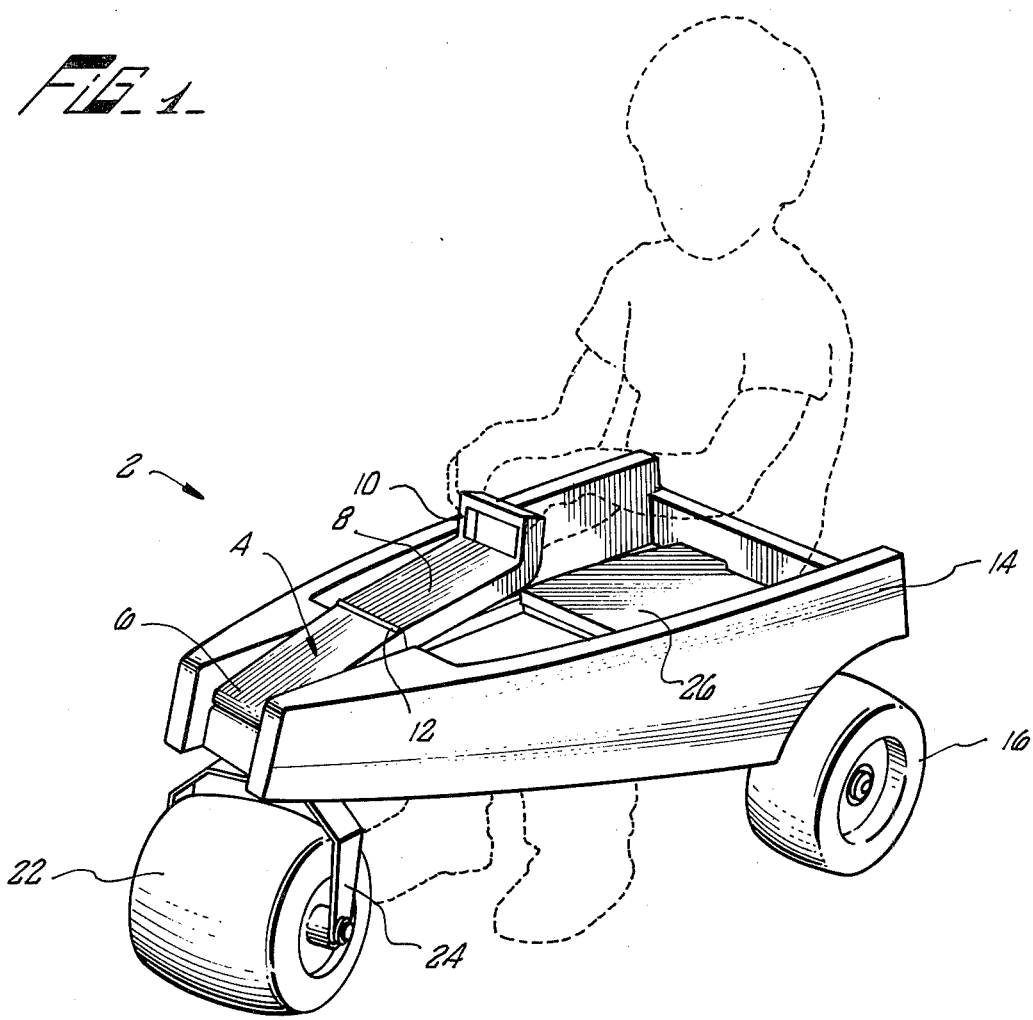
FIG. 1 is a front side perspective view to the present invention in a scooter mode of operation.

Referring to the perspective view of FIG. 1, the wheeled vehicle 2 of the present invention is disclosed with a child operator in dotted lines. A two part articulated handle 4 is shown in an operative position for the scooter embodiment of the present invention. The articulated handle 4 includes a first member 6 and a second member 8 having a rectangular handle 10. The respective first handle member 6 and second handle member 8 are pivotally connected by a pivotal joint 12 and can assume a retroflexion position.

The wheeled vehicle 2 further includes a body member 14 having an approximate trapezoidal shape. A pair of rear wheels 16 and 18 are connected to a rear axle 20 which is in turn mounted onto the body member 14. The front wheel 22 is swivelly mounted onto the body member 14 by a yoke 24.

Mounted within the trapezoidal body member 14 is a floor board 28 which includes a movable seat member 26. The seat member 26 can be pivotally mounted either to the stationary portion of the floor board 28 or to the interior sides of the body member 14. When the seat member 26 is rotated downward to form a base member for a wagon mode of operation, the rear side of the seat member and the adjacent stationary floor board 28 form a coplanar support surface.

Figure 4:
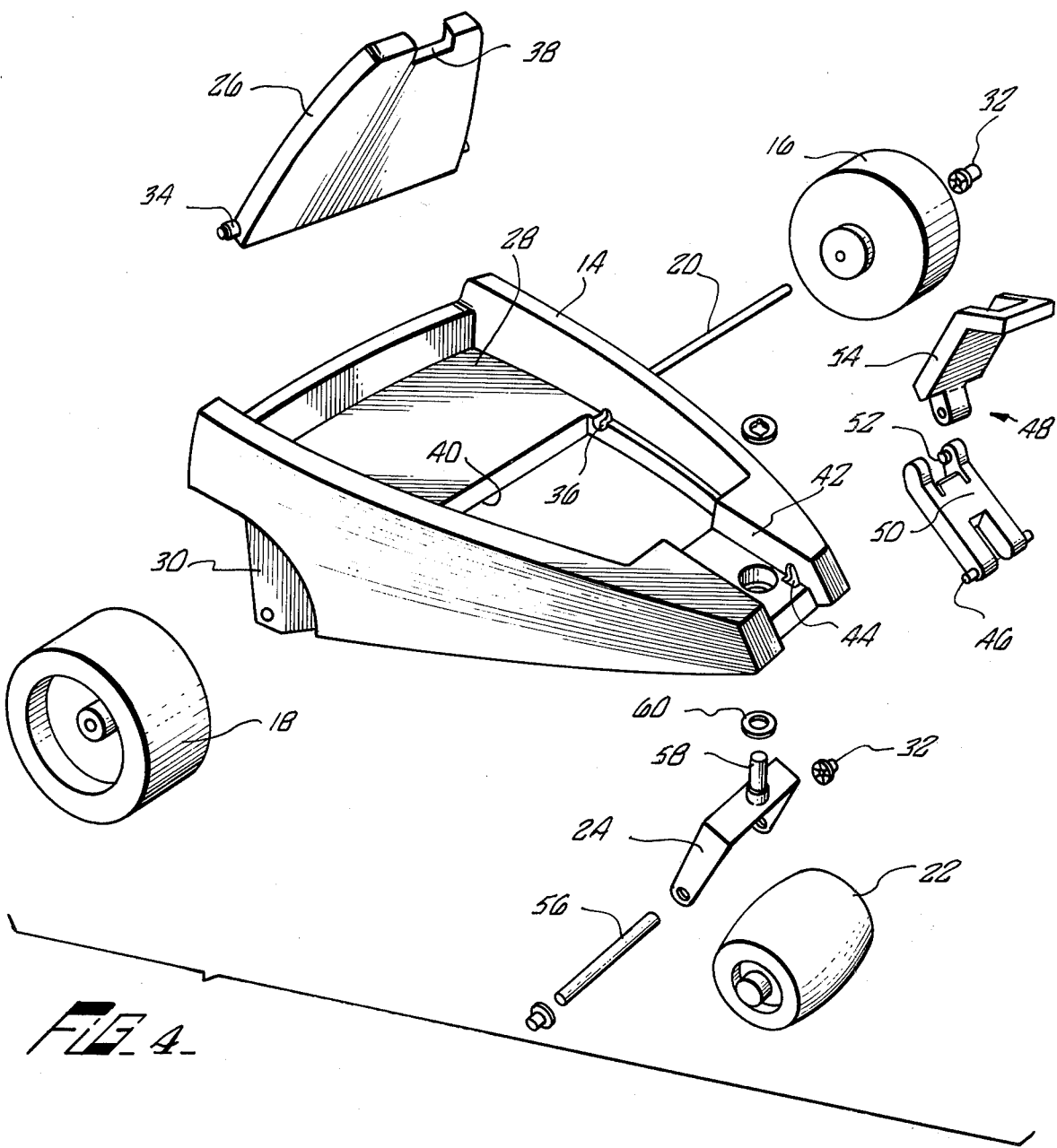
FIG. 4 is a perspective exploded view of the present invention.

Referring to FIG. 4, an exploded perspective view of one embodiment of the present invention is disclosed. As can be seen, the body member 14 can be appropriately molded from plastic and has an approximately trapezoidal shape. Various surface indicia or other design characteristics can be easily and subjectively included on the body member 14. Mounting flanges 30 are provided to receive the rear axle 20. The respective rear wheels 16 and 18 can be mounted on the axle 20 by a plastic palnut 32. Obviously the body member 14 can be made from other materials or combination of sub-parts within the parameters of the present invention.

The seat member 26 can be molded with intricate mounting pins 34 for engagement with mounting bores 36 in the body member 14. A handle slot 38 is appropriately provided on the seat member 26 to facilitate both operator grasping and pivotal movement of the seat member 26. The floor board 28 or support surface can be broadly construed to include the seat member 26 especially in the wagon mode of operation when the seat member 26 provides a coplanar support surface for the carrying of any articles. The relative size of the seat member 26 is advantageously designed to accommodate a child operator's legs through the opening 40 while providing a support seat surface when the seat member 26 is rotated 180° to lie on top of the floor board 28.

A recessed storage channel 42 extends horizontally across the central surface of the body member 14 and vertically downward on a front parallel side of the trapezoidal configuration. Appropriate mounting bores 44 are molded into the recessed storage channel 42 to receive mounting pins 46 on the articulated handle 48.

In this embodiment of the invention, the articulated handle 48 includes a first handle member 50 carrying mounting pins 46 and sub-mounting pins 52. Both the mounting pins 46 and the sub-mounting pins 52 are positioned on bifurcated arms to provide a degree of flexure to the first handle member 50 for facilitation of assembling of both the component parts of the articulated handle 48 and the mounting of the articulated handle 48 in the mounting bores 44. The second handle member 54 is designed to be pivotally connected to the sub-mounting pins 52 to complete the articulated handle 48. The design of the respective first and second handle members are such to permit a retroflexion movement, that is a folding of the second handle member 54 onto the first handle member 50. The cumulative thickness of the first and second handle members approximate the depth of the recessed storage channel 42 in the body member 14. Accordingly, when the articulated handle 48 is in a retroflexion position within the recessed storage channel 42, the handle surface will lie flush or coplanar with the surface of the body member 14.

The barrel shaped front wheel 22 is mounted on a front axle 56 which is rotatively supported within the yoke 24 and secured by palnuts 32. A mounting stud 58 receives a washer 60 and extends through a recessed opening 62 in the recessed storage channel 42. A push nut 64, locks the mounting stud 58 in the recessed opening 62 and permits a swivel motion to the front wheel 22.

Figure 2:
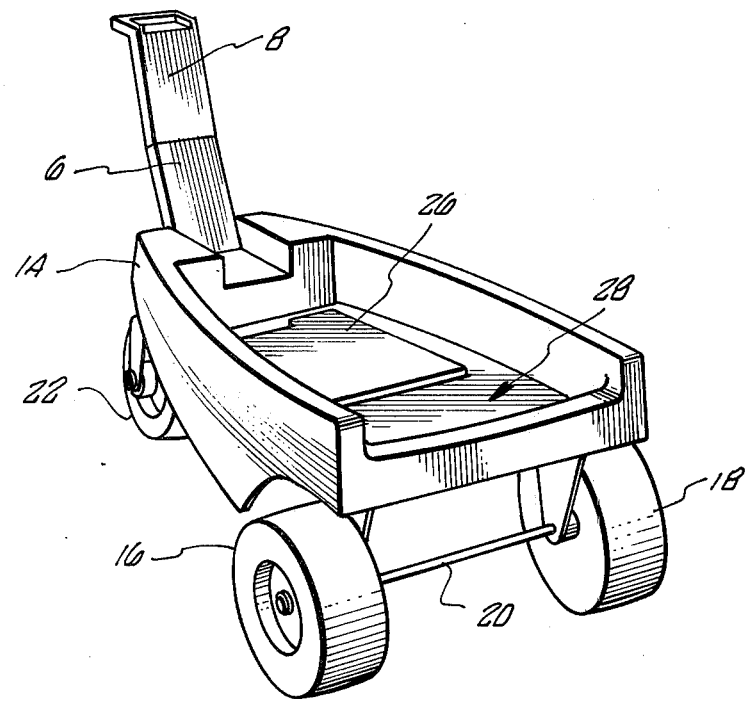
FIG. 2 is a rear side perspective view of the present invention.
Figure 3:
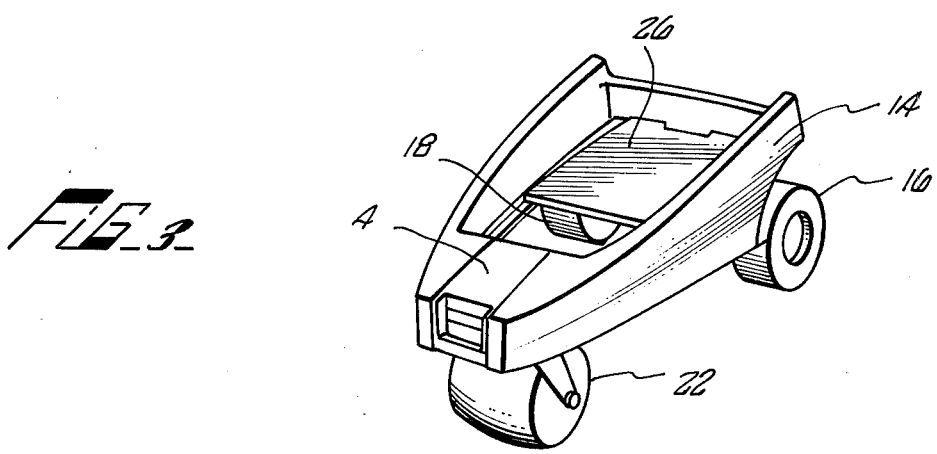
FIG. 3 is a front side perspective view of the present invention in a scooter mode of operation with a handle in a storage position.

Referring to FIG. 3, a perspective view is disclosed with the present invention in a scooter embodiment. In this view, the articulated handle 4 is in a retroflexion storage position within the recessed storage channel. THe seat 26 has been folded back to rest on its adjacent floor board 28 and thereby provide an opening for a child operator's legs. For comparison sake, reference is made to FIG. 2 wherein a wagon mode of operation is disclosed with the articulated handle 4 in an operative position and the seat member 26 rotated to cover the opening and provide a coplanar support surface adjacent the base portion of the floor board 28.

The features of the present invention have been specifically designed to provide a highly economical and versatile child's toy. Modifications of the present invention, however, are possible once the generic principles are understood by persons skilled in the toy industry.

Accordingly, the scope of the present invention should be measured solely from the following claims in which I claim:

1. A toy vehicle comprising;
    a body member having a recessed channel;
    a plurality of wheels rotatively connected to the body member; and
    an articulated handle member connected to the body member and further having at least two parts pivotally mounted to each other and capable of retroflexion, the articulated handle member being stored within the recessed channel when in a state of retroflexion.

2. The invention of claim 1 wherein the body member has a trapezoidal configuration.

3. The invention of claim 1 wherein one of the wheels is swivelly mounted.

4. The invention of claim 1 further including a floor board member having a first portion fixedly connected to the body member and a movably mounted second portion capable of providing an opening for an operators legs.

5. The invention of claim 1 wherein the articulated handle member is pivotally connected to the body member within the recessed channel.

6. The invention of claim 5 wherein the body member has a recessed channel adjacent the connection of the handle member of sufficient depth to permit the handle member to be stored within the recessed channel during retroflexion and to lay flush with the surface of the body member.

7. The invention of claim 1 further including a base member connected to the body member and a seat member movably connected relative to the base member and the body member whereby the seat member can be operatively moved to provide an opening for an operators legs within the body member and also positioned adjacent the base member to form a support surface with the base member within the body member.

8. A three wheeled toy vehicle having an approximately trapezoidal shape comprising;
    an approximately trapezoidal body member having a recessed channel;
    an articulated handle member connected to the trapezoidal body member adjacent the recessed channel and capable of retroflexion, the channel having sufficient depth to permit the handle member to be stored within the recessed channel during retroflexion;
    a pair of rear wheels rotatively connected to the body member;
    a front wheel rotatively connected to the body member;
    a base member connected to the trapezoidal body member adjacent the rear wheels, and
    a seat member movably connected relative to the base member and the body member whereby the seat member can be operatively positioned on the base member to provide an opening for an operator's legs within the body member and also positioned adjacent the base member to form a coplanar support surface with the base member within the body member.

9. The invention of claim 8 wherein the front wheel is swivelly connected to the body member.

* * * * *